Figure 1:
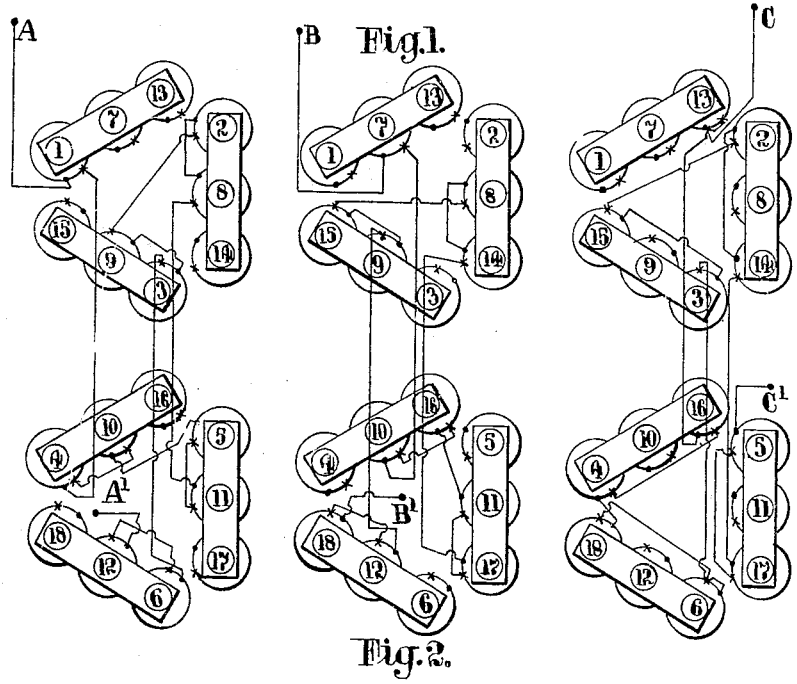

Jan. 24, 1928.

J. E. CALVERLEY ET AL 1,656,972

ELECTRIC CONVERTING APPARATUS

Filed April 25, 1925    3 Sheets-Sheet 1

J.E. Calverley
W.E. Highfield
INVENTORS

BY R.L.S.......

ATTORNEY

Jan. 24, 1928.

J. E. CALVERLEY ET AL 1,656,972

ELECTRIC CONVERTING APPARATUS

Filed April 25, 1925     3 Sheets-Sheet 2

INVENTOR
J. E. Calverley &
W. E. Highfield
BY
R. J. Craven
ATTORNEY

Jan. 24, 1928.

J. E. CALVERLEY ET AL 1,656,972

ELECTRIC CONVERTING APPARATUS

Filed April 25, 1925

3 Sheets-Sheet 3

Patented Jan. 24, 1928.

1,656,972

UNITED STATES PATENT OFFICE.

JOHN EARNSHAW CALVERLEY, OF PRESTON, AND WILLIAM EDEN HIGHFIELD, OF LONDON, ENGLAND, ASSIGNORS TO THE ENGLISH ELECTRIC COMPANY, LIMITED, OF LONDON, ENGLAND, A BRITISH COMPANY.

ELECTRIC CONVERTING APPARATUS.

Application filed April 25, 1925, Serial No. 25,917, and in Great Britain May 5, 1924.

This invention relates to apparatus used for conversion from alternating current to direct current or vice versa of the kind in which a normal polyphase system of a relatively small number of phases, for instance, three, is associated through the medium of a number of transformer cores with another system of a materially higher number of phases, for instance, thirty six, which system is connected to commutating gear and thereby to a direct current system. For convenience of discussion the alternating current system of the smaller number of phases will be spoken of as the primary system and the system of the larger number of phases will be spoken of as the secondary system, these terms being used for the purpose of distinguishing the systems rather than for the purpose of indicating their functions.

In such apparatus the static transformers serve the purpose of phase multiplication and generally also of voltage transformation. The latter function is of importance since the type of apparatus is particularly adapted for the production of extra high tension direct current, for instance, at 100,000 volts.

For the purpose of association with the commutating gear the windings forming the secondary system are arranged to form a symmetrical closed ring winding from which are taken at approximately equi-distant points a set of trappings leading to commutator segments. In general these segments are stationary and commutation is effected by the rotation of brushes, the movement of which has to be synchronized with the alternation of current in the secondary system.

Where in this specification and the accompanying claims windings are spoken of as ring windings or ring connected it is intended that it should be understood that windings three or more in number are joined end to end so as to form together a closed circuit. Such arrangements would be represented vectorially by closed figures, ranging according to number of sides from triangles upwards. The symmetrically closed ring winding referred to in the preceding paragraph will, from the example illustrated in the drawing referred to later and from the particulars given above, be seen to be represented by a thirty-six sided regular polygon.

As the two alternating systems have materially different numbers of phases, it is obvious that at least one of the systems must have the windings of each phase distributed over two or more cores of the transformers through which the two systems are interlinked. The particular kind of transformer arrangement with which the invention deals is that in which each phase of the primary system has its windings distributed in a number of sections connected in series and each located on a different core. Preferably the number of cores is such that there is no similar distribution of the windings of a phase in the secondary system, that is to say, there is either one core for each phase of the secondary system or, where the number of phases in this system is even, there is one core for each two diametrically opposite phases of the secondary system. With such an arrangement each phase of the secondary system can consist of a single coil or a group of coils on one core, which coil or group is similar to the coil or group forming each of the other phases. This leads to great simplicity in the manufacture and insulation of the secondary coils, having important advantages, particularly where this system carries current at a high voltage.

Figure 2:
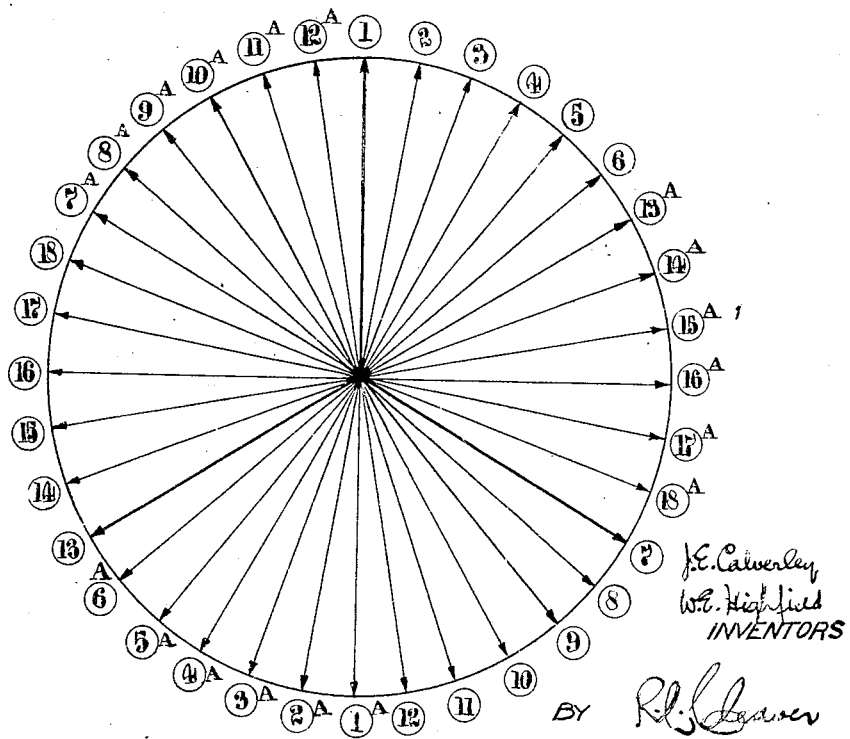
Figure 3:
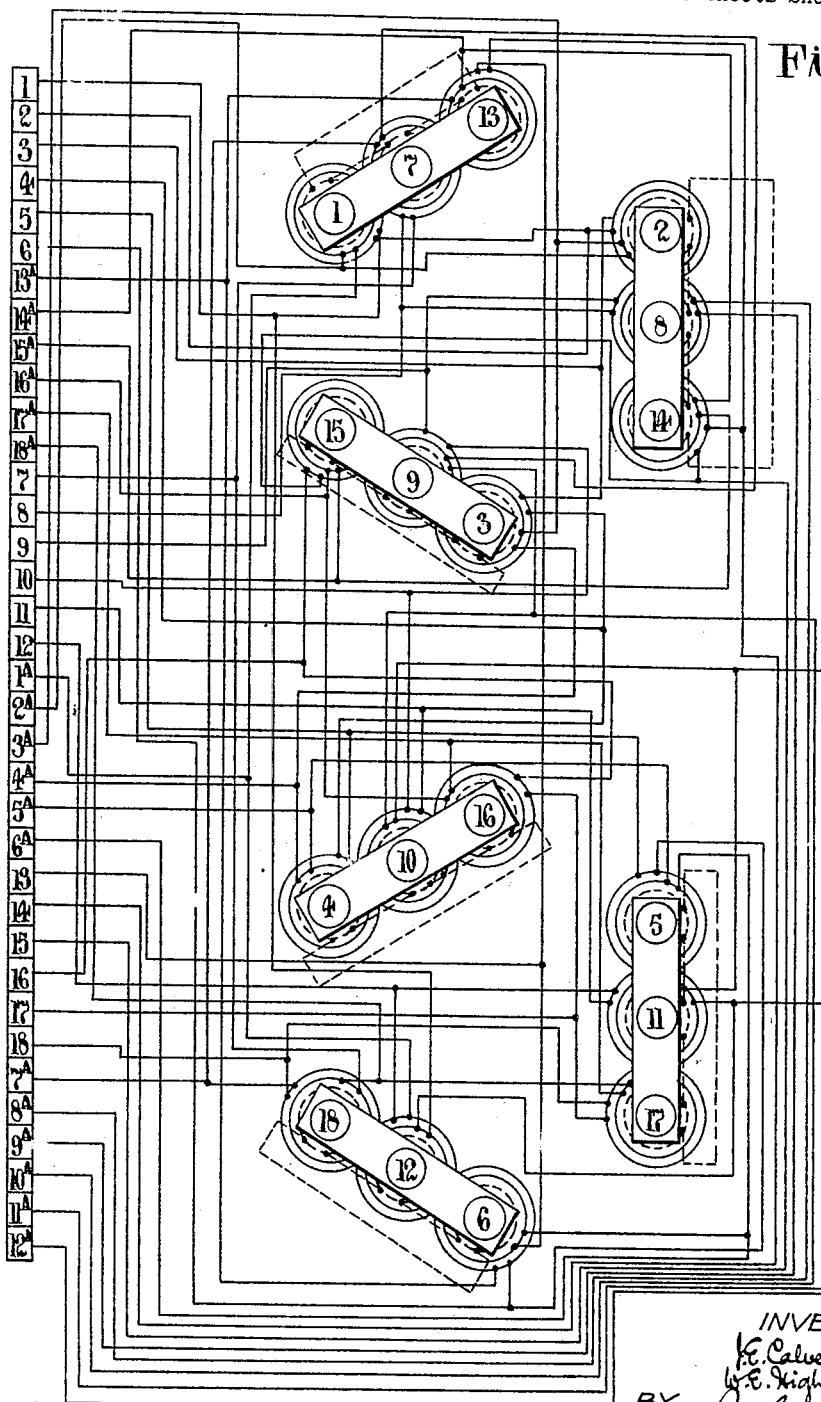

Apparatus of the kind above referred to is described in the specification of our British Patent No. 140,853, United States Patents Nos. 1,580,554, 1,366,057 and 1,567,032. It will be advantageous to utilize in the further discussion of the present invention the example described in the last mentioned of these specifications, utilizing for that purpose Figures 1, 2 and 3 of the accompanying drawings which agree with Figures 1, 2 and 8 of the said specification, while Figure 4 indicates diagrammatically the application of the present invention to the example. Figure 1 is a diagram indicating the arrangement of the primary windings. Figure 2 is a vector diagram indicating the phase relationship of the currents produced in the secondary windings on the various cores; this also shows the phase relationship of the flux in the cores. Figure 3 is a diagram indicating the arrangement of the secondary windings and certain additional windings the former being shown in full lines and the latter in broken lines.

In these drawings, the numbers 1 to 18 (enclosed in circles) and these numbers with the index letter A are used to indicate the thirty six phases of the secondary winding, the relationship of these phases being shown on Figure 2. The numbers 1 to 18 are also used in Figure 2 and elsewhere to indicate the cores of the transformers on which the corresponding secondary phase windings are located. These eighteen cores are comprised in six three-phase transformers which are shown in diagrammatic plan on Figure 1, being repeated three times in that figure so as to indicate in each of the three diagrams the path of the current of one of the three primary phases. This path in each instance extends from the terminal at the top marked A, B and C respectively through windings arranged on eleven of the cores to the terminal indicated by A′ B′ and C′. It will be clear that the primary windings of any one of the transformers must be so arranged as to give a three phase relationship between the fluxes at its cores. This can be done by an appropriate selection of the number of turns from the different primary phases to be applied to each core. It will be seen that the three phase transformer containing the cores 1, 7 and 13 is provided with a single primary winding on each core, the other transformers each has the primary winding formed of two sections from different phases. Accordingly, each primary phase comprises windings connected in series on eleven cores and on ten of the cores there are also located sections of windings connected into one of the other two phases. It will be understood that on each of these ten cores the relation between the numbers of turns of the two primary sections must be so adjusted as to give a resultant effect appropriate to the particular phase of the secondary system with which the core is associated. Such a distribution of the primary windings has the result that the form of the flux wave in each core does not bear any close relationship to the form of the voltage wave of the primary system and is influenced by conditions such as saturation of the iron circuit and reaction due to the current in the secondary winding, the former being present at no load and the latter being a function of the value of the load on the apparatus. These conditions introduce difficulties in the way of the satisfactory operation of the apparatus, particularly as regards the maintaining of the voltage ratio and the production of satisfactory commutation.

The relative instability of the flux wave form in a core of the transformer will perhaps be more readily appreciated if it is pointed out that it is only connected with the primary voltage wave form at no load by the condition that the sum of the rates of change of flux linkages in all the sections of a primary phase should pass through a cycle of values of the same form as the primary voltage. This does not in itself impose any particular value on the rate of change of the flux in any one of the large number of cores (for instance, eleven) with which the primary winding on that phase is linked. The approximately symmetrical interlinking of the various phases of the primary system and the grouping of the cores together to form polyphase transformer units has a certain influence in stabilizing the flux wave form so that it may not vary very greatly from core to core. But it is clear from the above explanation, and it has been demonstrated by means of the oscillograph, that the form of the wave of flux in a core is materially different from the form which would result if it were determined by the primary voltage applied to a winding on a single core. Similarly, it has been demonstrated that the flux form in a core varies very greatly for different values of the load on the apparatus.

The chief influence tending to distort the wave of the flux at no load appears to be saturation of the iron cores of the transformers. As each phase of the primary winding comprises a number of sections arranged on different cores in which the flux waves are displaced in phase relative to each other, it will be seen that the flux density in any particular core reaches a value at which the permeability of the iron decreases rapidly at a time when other cores carrying windings in the same primary phase are in a condition in which the permeability has a materially higher value. The effect of this is to cause a reduction in the rate of change of flux in those cores approaching saturation with a corresponding increase in other cores linked with the same primary phase. Accordingly the wave form of the voltage generated in a section of the secondary winding at no load shows a flattening at the top and steeper slopes at the sides than the primary voltage wave. Obviously for different values of the primary voltage this distorting effect due to saturation will vary in degree so that the voltage ratio at no load will not be constant but will depend upon the value of the primary voltage.

It is the object of the present invention to remove the disadvantages produced by the indefiniteness and instability of the wave form of the flux in the individual cores of the polyphase transforming apparatus having primary and secondary windings of the kinds indicated associated with the commutating gear on the secondary side. This is done by applying to each core an arrangement whereby a definite wave form of flux is impressed upon and maintained in that core under the influence of an alternating electromotive force produced by some means external to the primary and secondary systems and having the same value for each core and the appropriate phase relationship for the various cores. The wave form of flux may be impressed on each core by means of a separate winding or by utilizing the secondary winding or a part of it. In each case, however, there must be direct connections between the winding to which the additional E. M. F. is applied and the source of this E. M. F., and it is important that the said winding and connections should be of low resistance and self induction so that the wave form of the E. M. F. shall not be materially distorted by the passage of current, whatever the wave form of this current may be, within the working capacity of the machine. Similarly the source of E. M. F. should be so designed as to resist distorting influences. The necessary polyphase E. M. F.'s may be supplied by a separate alternator driven synchronously with the rotation of brush gear but may be conveniently obtained by tappings taken from the armature winding of the synchronous motor by which the brush gear is driven provided of course that this motor be designed of a sufficient capacity to carry the additional current which will flow through these tappings.

In the specification of our Patent No. 1,366,057 and in that of our British Patent No. 221,551 is described the provision on the transformer cores of a third winding through which alternating current can be sent by an external source and in the latter specification it is indicated that the external source may be simply the armature of the synchronous motor driving the brush gear. It has to be pointed out, however, that arrangements of the third windings described in those specifications do not comply with the requirements indicated above since there is no direct connection between the armature winding and each of the coils. The coils are in fact arranged so as to form a system of the same number of phases as that of the primary winding, and each phase comprises a number of sections distributed over the cores in a manner following precisely the distribution which the primary winding has. As regards fixing wave form therefore the additional winding has not more influence than the primary winding in those cases. That fact, however, does not prevent the provision of those windings in the manner indicated in the said specifications from having the useful results that the magnetizing current for the transformers is chiefly supplied through the third set of windings by the synchronous motor and a back E. M. F. may be set up in the secondary circuit and applied to the commutator prior to the connection of the latter to the direct current system. By the present invention these results can also be attained and at the same time there are present the other advantageous effects above indicated.

Figure 4:
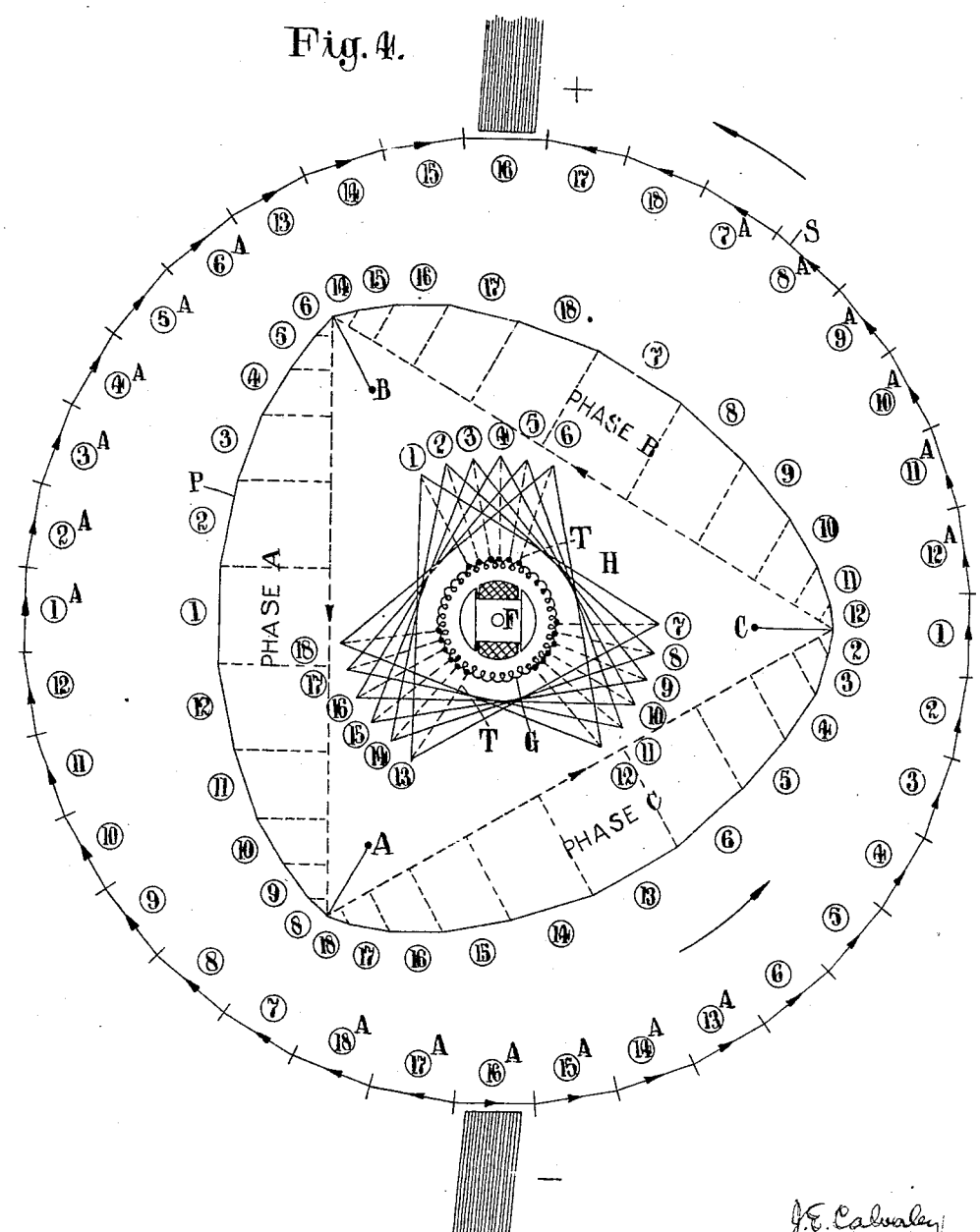

In Figure 4 is shown diagrammatically apparatus similar to that indicated by the preceding figures but having combined with it a synchronous alternating current machine and means whereby that machine is enabled to impress on the eighteen transformer cores a definite wave form of flux. The secondary winding is indicated vectorially by a thirty-six sided polygon S forming the outer part of the diagram, the positions of the positive and negative brushes for the direct current in relation to this winding are shown, the brushes being located at the top and bottom of the diagram respectively. The phase relationship of the sections of the secondary winding is shown by the angular relationships of the sides of the polygon and the arrow heads applied to them as well as by the use of a numbering similar to that of Figure 2. In this connection it is pointed out that while the arrow heads on corresponding windings on the two sides of the diagram, for instance, 1 and 1^A point in parallel directions, that is, vertically upward in the case mentioned, these two sections are actually in opposition of phase as shown by the fact that they oppose each other around the closed circuit formed by the secondary winding. In each half of this winding (considering it to be divided by the brushes into two halves) there is found a section having an electro-motive force equal in magnitude and opposite in phase to each of the sections in the other half. This of course is an essential for a direct current winding which in effect this secondary winding is.

In the same way that the external polygon S shows vectorially the phase and magnitude of the voltage developed in the secondary winding the intermediate figure P shows the voltage conditions in the primary system which is here shown as a delta connected system, the terminals A' B' and C' indicated in Figure 1 being omitted from Figure 4 since the windings instead of being connected to them are connected to the other terminals B, C and A respectively. The voltage applied to the terminals A, B and C from the external supply is indicated in each case by the broken line forming one side of the triangle which is the inner part of the figure P. The outer part of this figure is formed by vectors indicating the back E. M. F.'s produced in the sections of the primary windings which are arranged in series in each phase, the location of the winding on a transformer core being indicated by the application to it of the number of that core. The order of arrangement of these vectors does not follow the sequence of windings shown in Figure 1. That sequence is determined mainly by practical conditions of making the connections between the cores. The sections of the outer part of the figure P are grouped so as to be symmetrical and to be parallel with the corresponding sections of the secondary winding of the figure S. It will be noted that the vectors forming the outer part of the figure P are of unequal length. This is of course due to the fact that the number of turns of each section of the primary winding varies from core to core.

The central part of Figure 4 indicates the synchronous machine by its field F and armature G and the means (indicated by the system of windings H connected with the armature winding G) for applying to the eighteen transformer cores a flux wave form determined by the machine FG. This latter part consists of a series of deltas each of similar magnitude vectorially and each having a side which is in phase with the corresponding sides of the figures S and P. Each of these deltas is connected at the junctions of its sides by tappings T with the armature winding G. For convenience in applying the numerals to this additional winding, which for ease of reference may be spoken of as a compensating winding, they have been placed at the angles of the triangles instead of at the sides as in the other parts of this diagram. Each numeral relates to that side of the triangle which it follows when considering a counter-clockwise rotation around the diagram. It will be seen that all the sections of the compensating windings H are similar and each one is in phase with one of the sections of the secondary winding S. It will be recognized accordingly that it is possible to omit the compensating winding H, utilizing eighteen of the sections of the secondary winding in its place by connecting the ends of these sections with the armature winding G by tappings. Conditions frequently determine however that it is desirable to have a separate compensating winding. The additional windings H in the example shown have the form of an appropriate and equal number of turns on each core connected together in six delta groups from each of which is carried three connections to three points on the armature winding of the synchronous motor which are spaced apart by 120 electrical degrees. There will therefore be eighteen tappings taken from the armature winding, the tappings for the different groups being spaced apart around the winding by an electrical angular distance corresponding to the difference between the phases of the fluxes in the different core groups. In the example mentioned this spacing will be 10 degrees.

In the example illustrated there is one compensating winding H for each core. It is possible, however, that it may be advantageous in some cases to make one compensating winding for each secondary phase where there are two of these phases on each core so that each core would have two compensating coils connected oppositely. By that means more uniform utilization of the winding of the synchronous motor armature would be obtained with attendant advantages.

Even where additional compensating windings are provided on the transformer cores it may be preferable also to connect the armature winding G to the secondary system so that there may be a very definite connection between the phase relationship of the electro-motive forces produced in that armature winding and in the secondary system. This is of further importance when the alternating current machine FG is the synchronous motor which rotates the brush gear. This connection with the secondary system may be carried out by a number of tappings, for instance, three, taken from the armature winding to points in the secondary system having corresponding values of potential and phase with the tapping points in the armature, these points being located so as to provide a symmetrical polyphase connection.

Alternatively connection of the synchronous motor armature to the primary system may be used. In such an arrangement a number of tappings equal to the number of phases of the primary system and correspondingly spaced will be taken from the armature to the terminals or to other appropriately located points of the primary windings. This makes it possible for the motor to draw energy directly from the primary system, with other possible advantages. Since the phase displacement between the currents in the primary and secondary systems will be approximately independent of the load this connection of the motor with the primary system will not prevent the maintaining of the brushes in correct relation to the secondary currents.

Where an additional winding is applied to each transformer core for the purposes of this invention it is desirable that it should be arranged so as to have approximately equal effect on the whole of the secondary winding on the core. Where this latter is distributed over a considerable length of core, the additional winding should also be distributed rather than concentrated at a single point in the length of the core, or if concentrated should be located near the middle of the core rather than at one end. Attention should also be given to similar considerations in the case where the place of the additional winding is taken by part of the secondary winding.

Although the invention has been previously described in connection with particular numbers of phases in the primary and secondary system, viz, three and thirty-six, it is to be clearly understood, however, that there is no particular relationship of these numbers to the invention. They are simply given as a practical illustration of conditions to which the invention applies. In general the primary or smaller number of phases will be one of the numbers employed in the ordinary generation and transmission of alternating current energy. The other system will be materially greater in its number of phases but the actual ratio may vary through considerable limits.

The effect of the invention may be recognized by considering first what takes place at no load and afterwards what occurs under load in converting apparatus embodying the invention and comprising three phase primary windings disposed on eighteen cores as in an example previously referred to in combination with a thirty six phase secondary winding and a third winding on each core directly connected to appropriate points on the armature winding of the synchronous motor which drives the brush gear, which armature winding is also given a three phase connection to appropriate points in the secondary winding.

Assuming that conversion is being effected from alternating current to direct current, the secondary winding at no load will not carry current. The primary winding must supply the energy current, which by the action of the transformers reaches the synchronous motor and keeps it in rotation. This motor is so designed as to produce in its armature winding a voltage wave form approximating to sine shape and this impresses on each core of the transformer a flux wave of corresponding shape. By adjusting the excitation of the motor to the correct value, it may be made to supply substantially the whole of the magnetizing current to the transformers. By the definite value and wave form of flux produced in each transformer core under the influence of the synchronous motor, the distribution of the back E. M. F. for the primary windings and the value and wave form of the E. M. F. of the secondary windings is determined.

On loading the direct current side of the apparatus to a steady value, there will flow through the brushes a current of constant amount and this will be transformed by commutation into an alternating current having a wave form which is approximately rectangular. In the primary circuit, of which the impressed voltage form is assumed to be a sine shape, will flow a current which will also be approximately a sine shape. This is determined by several influences, amongst which the distribution of the primary winding and the action of the definite flux of each core upon it are of principal importance. Owing to the sections of this winding being connected in series and distributed over cores which link them with sections of other phases and have fluxes differing in phase from core to core, a very strong damping action would be exerted on harmonics induced in the current wave. This action is intensified by the impressing of a flux on each core which is definite in value and wave shape and thereby assists to maintain at each instant the symmetry of the primary system.

Since we have in this primary winding a current of substantially sine form and in the secondary winding a current of rectangular shape, it follows that these currents alone cannot produce at each instant the balance of ampere turns on a transformer core. As, however, each section of the additional winding is connected directly with the armature of the synchronous motor, it is possible for a current to flow through the additional winding having a wave shape appropriate to effect a balance of ampere turns on the core on which that winding is located. This wave shape will be determined by the difference between the wave shapes of primary and secondary currents and by the amounts of magnetizing currents supplied by the synchronous motor to the transformer and energy current taken from the transformer by the motor. This shape will obviously be mainly composed of harmonics, the fundamental wave being of comparatively small amplitude.

As regards the supplying of the difference between the primary and secondary energy ampere turns, the action of the synchronous motor is mainly that of transferring the excess energy input from one phase of the primary system to another phase to make up the deficiency which exists there. In so far as the total energy input to the three primary phases may not be a perfectly constant quantity, the transfer may be accompanied by a slight amount of storage action.

In the absence of the additional winding or its equivalent, with the means for supplying a constant flux wave form to each transformer core the balance of ampere turns has to be brought about by the distortion of the current waves in the primary and secondary systems. The disposition of the primary windings as previously indicated prevents the current flowing in them from undergoing very material distortion. Accordingly, the distorting effect is evident mainly in the secondary system and has been found to be very great and to interfere with both the commutation and the voltage regulation by distorting both the current and the voltage waves, the former being made evident by the production of ripples in the direct current.

Where the transformer cores are built up into three phase groups, it is possible to utilize on each group a closed circuit winding linked only with the cores of that group as set out in the specification of our Patent No. 1,567,032 (and shown in broken lines in Fig. 3), for the purpose of providing a low reluctance path for certain harmonic currents and thereby shielding the secondary circuit from a certain amount of distortion. As, however, by this means it is only possible to shield the secondary winding from harmonics of which the frequency is three times, or a multiple of three times, that of the fundamental, the short circuited winding, while of material advantage, will leave considerable distorting influences to be dealt with. Oscillograph records taken from a secondary winding of a transformer provided with such a short circuited winding shows that a harmonic of five times the fundamental frequency is prominent in the voltage wave. The present invention provides for the suppression or great reduction of the values of the harmonics in the voltage wave of the secondary system by the maintaining of an appropriate wave form for the flux in each core. In this, the action of the additional windings connected with the external source of the E. M. F. may be supplemented advantageously by the action of a short circuited winding such as described in the specification of our Patent No. 1,567,032.

Owing to the necessity of building up the primary winding of each one of the cores from sections taken from two phases of the primary system and owing to the fact that fractions of a turn cannot be used in these sections, it is sometimes impossible to adjust the number of turns in the sections of the primary windings so as to obtain precisely the correct value of the resultant primary ampere turn both as regards magnitude and phase. The additional winding provided in accordance with the present invention has the further advantage that small discrepancies of this kind can be corrected by the action of the current in these additional windings. By this means more perfect symmetry in the system results which is of importance in facilitating the obtaining of satisfactory commutation.

What we claim as our invention and desire to secure by Letters Patent is:—

1. Electric converting apparatus comprising a plurality of transformer cores, windings on said cores including a polyphase set (called the primary) of a relatively small number of phases and another polyphase set (called the secondary) of a materially higher number of phases, each phase of the primary set having its windings distributed in a number of sections connected in series and each located on a different transformer core, the secondary set forming a balanced closing ring winding, a commutator, tappings connecting said closed ring winding with the segments of the commutator, means for producing externally to the primary and secondary systems an alternating electro-motive force and means for stabilizing the wave form of the flux in the individual transformer cores by the influence of the said externally produced electro-motive force.

2. Electric converting apparatus comprising a plurality of transformer cores, windings on said cores including a polyphase set (called the primary) of a relatively small number of phases and another polyphase set (called the secondary) of a materially higher number of phases, each phase of the primary set having its windings distributed in a number of sections connected in series and each located on a different transformer core, the secondary set forming a balanced closed ring winding, a commutator, tappings connecting said closed ring winding with the segments of the commutator, means for producing externally to the primary and secondary systems an alternating electro-motive force, connections from said electro-motive force producing means to a winding on each of said cores, said windings and connections forming means for stabilizing the wave form of the flux in the individual cores.

3. Electric converting apparatus comprising a plurality of transformer cores, windings on said cores including a polyphase set (called the primary) of a relatively small number of phases and another polyphase set (called the secondary) of a materially higher number of phases, each phase of the primary set having its windings distributed in a number of sections connected in series and each located on a different transformer core, the secondary set forming a balanced closed ring winding, a commutator, tappings connecting said closed ring winding with the segments of the commutator, means for producing externally to the primary and secondary systems an alternating electro-motive force, connections of low resistance and low self induction from said electro-motive force producing means to a winding on each of said cores, said windings and connections forming means for stabilizing the wave form of the flux in the individual cores.

4. Electric converting apparatus comprising a plurality of transformer cores, windings on said cores including a polyphase set (called the primary) of a relatively small number of phases and another polyphase set (called the secondary) of a materially higher number of phases, each phase of the primary set having its windings distributed in a number of sections connected in series and each located on a different transformer core, the secondary set forming a balanced closed ring winding, a commutator, tappings connecting said closed ring winding with the segments of the commutator, a synchronous electric machine having a polyphase winding, means for connecting said winding with a winding on each of said cores, said connecting means and windings forming means for stabilizing the wave form of the flux in the individual cores.

5. Electric converting apparatus comprising a plurality of transformer cores, windings on said cores including a polyphase set (called the primary) of a relatively small number of phases and another polyphase set (called the secondary) of a materially higher number of phases, each phase of the primary set having its windings distributed in a number of sections connected in series and each located on a different transformer core, the secondary set forming a balanced closed ring winding, a commutator, tappings connecting said closed ring winding with the segments of the commutator, a synchronous electric machine having a polyphase winding, connections of low resistance and self induction leading directly from said winding to a winding on each of the said cores, said connections and windings forming means for stabilizing the wave form of the flux in the individual cores.

6. Electric converting apparatus comprising a plurality of transformer cores, windings on said cores including a polyphase set (called the primary) of a relatively small number of phases and another polyphase set (called the secondary) of a materially higher number of phases, each phase of the primary set having its windings distributed in a number of sections connected in series and each located on a different transformer core, the secondary set forming a balanced closed ring winding, a commutator, tappings connecting said closed ring winding with the segments of the commutator, a synchronous electric machine having a closed ring winding, tappings on said ring winding arranged with uniform electrical spacing over at least part of the length of the winding and connections of low resistance and self induction from said tappings to a winding on each of said cores, said connections and windings forming means for stabilizing the wave form of the flux in the individual cores.

7. Electric converting apparatus comprising a plurality of transformer cores, a commutator, a polyphase set of windings (called the primary) of a relatively small number of phases, another polyphase set (called the secondary) of a materially higher number of phases and a third set (called the compensating), each phase of the primary set having its windings distributed in a number of sections connected in series and each located on a different transformer core, the secondary set forming a balanced closed ring winding connected with the segments of the commutator, the compensating windings being connected together in closed grouping and tapped, means for producing externally to the primary and secondary systems an alternating electro-motive force, said means comprising a polyphase winding, connections between this polyphase winding and the tappings of the compensating windings, said connections and compensating windings forming means for stabilizing the wave form of the flux in the individual cores.

8. Electric converting apparatus comprising a plurality of transformer cores, a commutator, a polyphase set of windings (called the primary) of a relatively small number of phases, another polyphase set (called the secondary) of a materially higher number of phases and a third set (called the compensating), each phase of the primary set having its windings distributed in a number of sections connected in series and each located on a different transformer core, the secondary set forming a balanced closed ring winding connected with the segments of the commutator, the compensating windings being connected together in closed grouping and tapped, a synchronous electric machine having a closed ring winding tapped at uniform electrical distances over at least a part of its length, connections of low resistance and self induction between the tappings on this winding and those on the compensating windings, said tappings and compensating windings forming means for stabilizing the wave form of the flux in the individual transformer cores.

9. Electric converting apparatus comprising a plurality of transformer cores, a commutator, a polyphase set of windings (called the primary) of a relatively small number of phases, another polyphase set (called the secondary) of a materially higher number of phases and a third set (called the compensating), each phase of the primary set having its windings distributed in a number of sections connected in series and each located on a different transformer core, the secondary set forming a balanced closed ring winding connected with the segments of the commutator, the compensating windings being connected in a plurality of delta groups with tappings at the angles thereof, a synchronous electric machine having a closed ring winding tapped at uniform electrical distances over at least a part of its length, connections of low resistance and self induction between the tappings on this winding and those on the compensating windings, said tappings and compensating windings forming means for stabilizing the wave form of the flux in the individual transformer cores.

10. Electric converting apparatus comprising a plurality of transformer cores arranged in three phase groups, a commutator, a polyphase set of windings (called the primary) of a relatively small number of phases, another polyphase set (called the secondary) of a materially higher number of phases and a third set (called the compensating), each phase of the primary set having its windings distributed in a number of sections connected in series and each located on a different transformer core, the secondary set forming a balanced closed ring winding connected with the segments of the commutator, the compensating windings on each three phase group of cores being delta connected, the resulting closed windings being tapped at the angles, a synchronous electric machine having a closed ring winding tapped at uniform electrical distances over at least a part of its length, connections of low resistance and self induction between the tappings on this winding and those on the compensating windings, said tappings and compensating windings forming means for stabilizing the wave form of the flux in the individual transformer cores.

11. Electric converting apparatus comprising a plurality of transformer cores, a commutator, a polyphase set of windings (called the primary) of a relatively small number of phases, another polyphase set (called the secondary) of a materially higher number of phases and a third set (called the compensating), each phase of the primary set having its windings distributed in a number of sections connected in series and each located on a different transformer core, the secondary set forming a balanced closed ring winding connected with the segments of the commutator, each compensating winding being distributed over the length of its core and connected with other compensating windings in closed grouping, means for producing externally to the primary and secondary systems an alternating electro-motive force, said means comprising a polyphase winding, connections between this polyphase winding and the tappings of the compensating windings, said connections and compensating windings forming means for stabilizing the wave form of the flux in the individual cores.

In testimony whereof we affix our signatures.

JOHN EARNSHAW CALVERLEY.
WILLIAM EDEN HIGHFIELD.